INVENTORS
**FRANK KOPEC.
CLAYTON W. SHOFF.
GEORGE F. GORON.**
BY *Gordon N. Cheng* AGENT.

INVENTORS
**FRANK KOPEC.
CLAYTON W. SHOFF.
GEORGE F. GORON.**

United States Patent Office 3,382,559
Patented May 14, 1968

1

3,382,559
POWER ASSISTED CLAMPING AND
TORQUE MECHANISM
Frank Kopec, George F. Goron, and Clayton W. Shoff,
South Bend, Ind., assignors to The Bendix Corporation,
a corporation of Delaware
Filed Nov. 25, 1966, Ser. No. 597,087
6 Claims. (Cl. 29—240)

ABSTRACT OF THE DISCLOSURE

Power assisted clamping and torqueing apparatus for coupling two threadedly engaged members wherein one of the two members is held fixed by fluid pressure operated clamping mechanism under controlled clamp pressure and the second of the two members is engaged by a controlled pressurized fluid operated rotatable member which rotates the second member to the fixed member to threadedly engage the same with a predetermined torque effort.

It It has been a practice to assemble or disassemble two mating threaded members such as, for instance, an end fitting to an aircraft strut cylinder by manual effort which requires considerable physical effort in combination with a tool providing a relatively long lever arm to thereby generate the necessary torque which, for obvious reasons, cannot be accurately controlled. Such a procedure is time consuming, requires personnel of suitable strength and endurance and does not provide a consistent desired torque accuracy. It is therefore an object of the present invention to provide an automatic power assisted clamp and torque device for assembling two threaded members requiring an accurately controlled relatively large torque effort.

It is another object of the present invention to provide a pressurized fluid powered clamping fixture for holding a first threaded member and a pressurized fluid powered rotatable member for rotating a second threaded member threadedly engaged with the first threaded member to automatically obtain a predetermined accurately controlled torque effort therebetween.

It is still another object of the present invention to provide a fluid pressure powered reversibly rotary member for driving one rotatable threaded element in one direction into engagement with a fixed second threaded element quickly and accurately under a controlled torque condition to effect assembly thereof or for driving the one rotatable threaded member in the opposite direction relative to the fixed second threaded member under a relatively large break-away torque condition to effect disassembly thereof.

It is a further object of the present invention to provide a rugged and relatively inexpensive fluid pressure powered clamping and torque mechanism which is easily operated and maintained.

Other objects and advantages of the present invention will be apparent from the following description taken with the accompanying drawings wherein.

2

Figure 6:
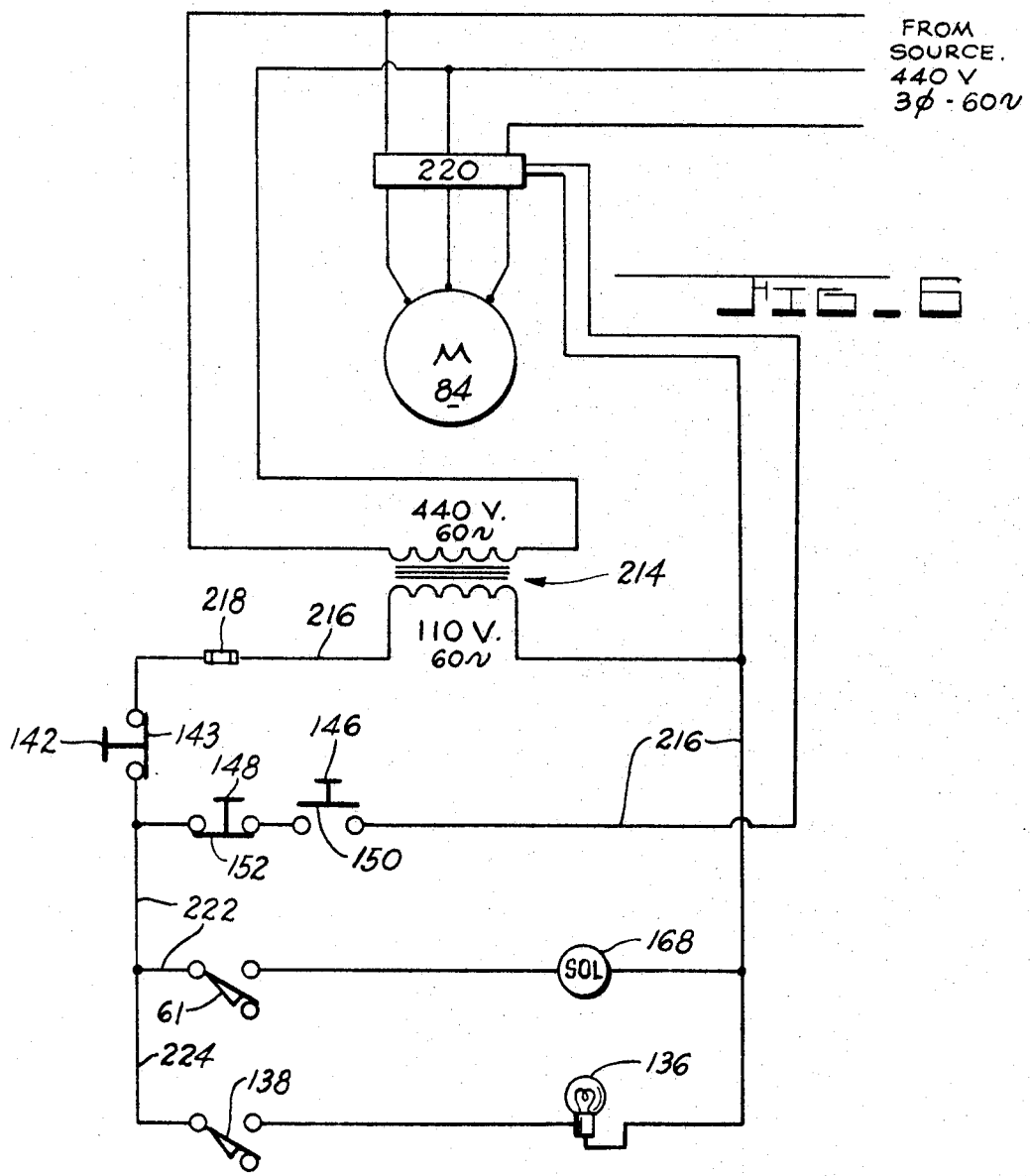
Figure 7:
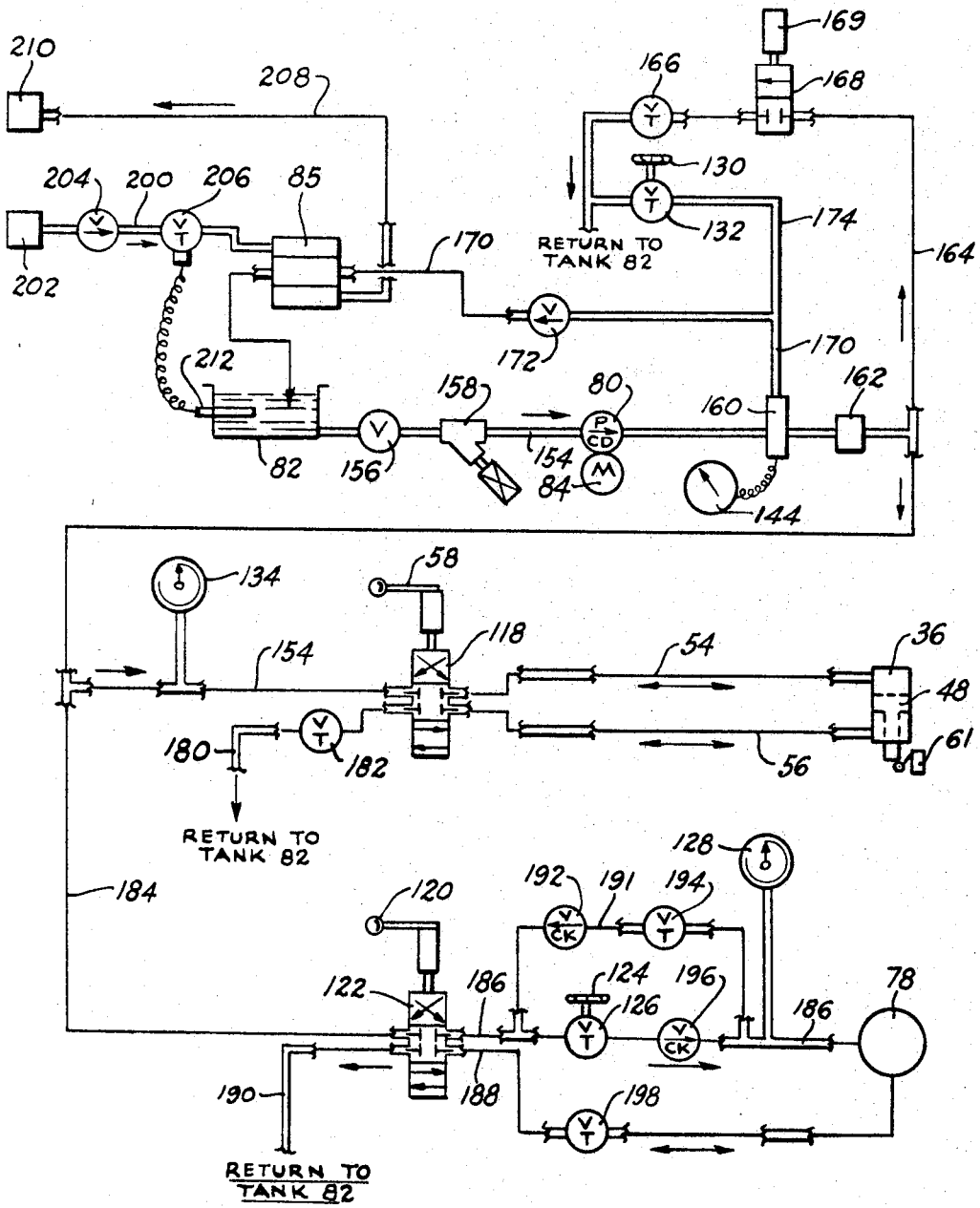

FIGURE 6 represents a schematic diagram of the electrical control circuit of the present invention;

FIGURE 7 represents a schematic diagram of the hydraulic control circuit of the present invention.

Figure 1:
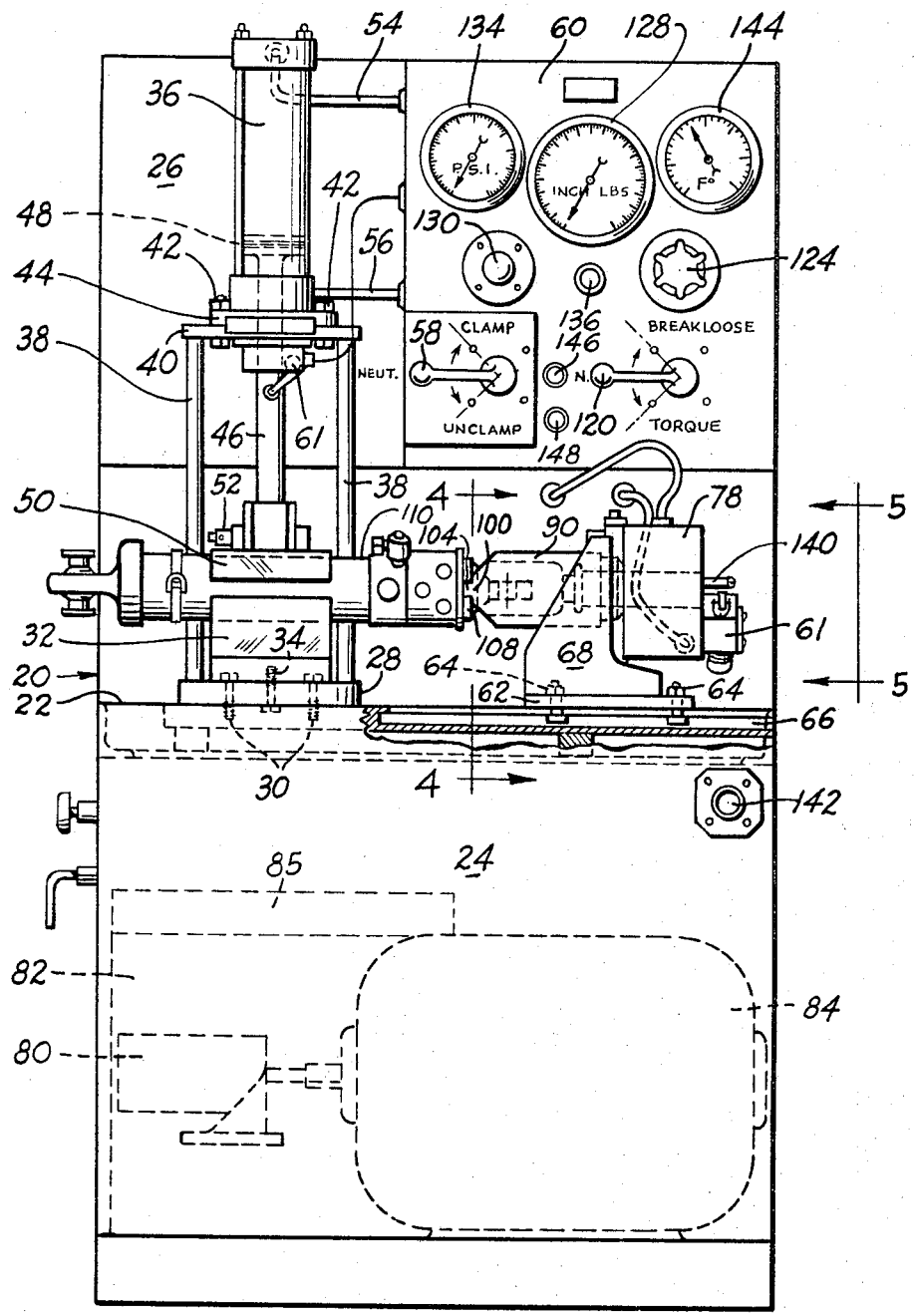
FIGURE 1 represents a front elevation view of the present invention.
Figure 2:
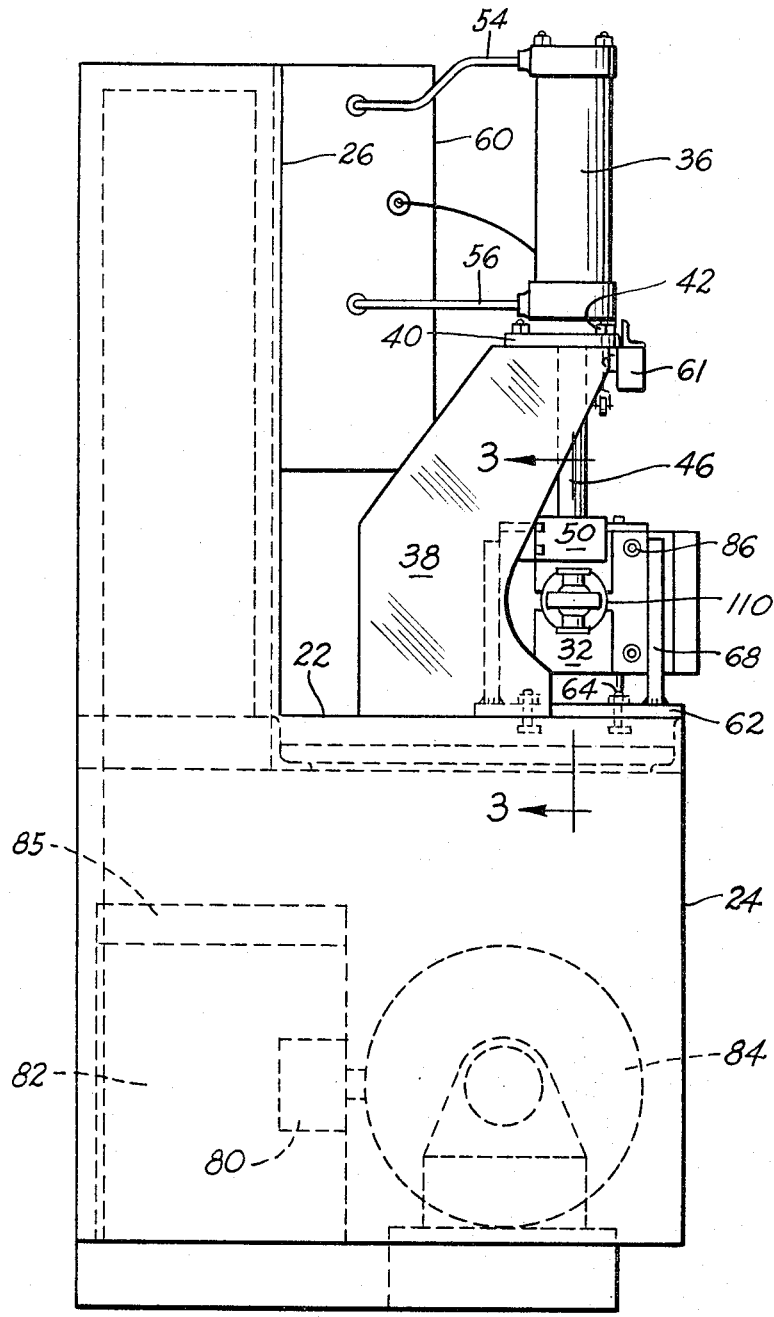
FIGURE 2 represents a left elevation view of the present invention.

Referring to the drawings and FIGURE 1, in particular, numeral 20 designates a support framework having a horizontal table portion 22 and vertically extending front and back portions 24 and 26, respectively.

A fluid pressure operated work clamping device includes a base portion 28 removably secured to table 22 by any suitable fasteners such as bolts 30. A cradle 32 having a curved work engaging bearing surface is removably secured to base 28 by suitable fasteners such as bolts 34. A cylinder 36 fixedly secured in overhead position relative to base 28 by vertically extending braces 38 secured at one end to base 28 and at the opposite to a plate 40 which plate, in turn, is secured by a plurality of bolt and nut arrangements 42 to a flange 44 integral with cylinder 36. A shaft 46 fixedly secured to a piston 48 slidably carried in cylinder 36 extends through the end of cylinder 36 into engagement with a cradle 50 secured to shaft 46 by a fastener such as lock bolt 52. The cradle 50 is provided with a curved work engaging bearing surface similar to that of cradle 32. Conduits 54 and 56 communicate opposite ends of cylinder 36 with a source of relatively high pressure fluid or a relatively low pressure fluid drain source via valve means, not shown, under control of an operator actuated lever 58 mounted on a control panel 60. High pressure fluid is admitted through conduit 54 to one side of piston 48 while conduit 56 exhausts fluid from the opposite side of piston 48 or the reverse to thereby actuate piston 48 in one direction or the other depending upon the position of the lever 58.

An electrical limit switch 61 fixedly secured to plate 40 is engageable with and actuated by cradle 50 during an upward stroke of piston 48.

Figure 3:
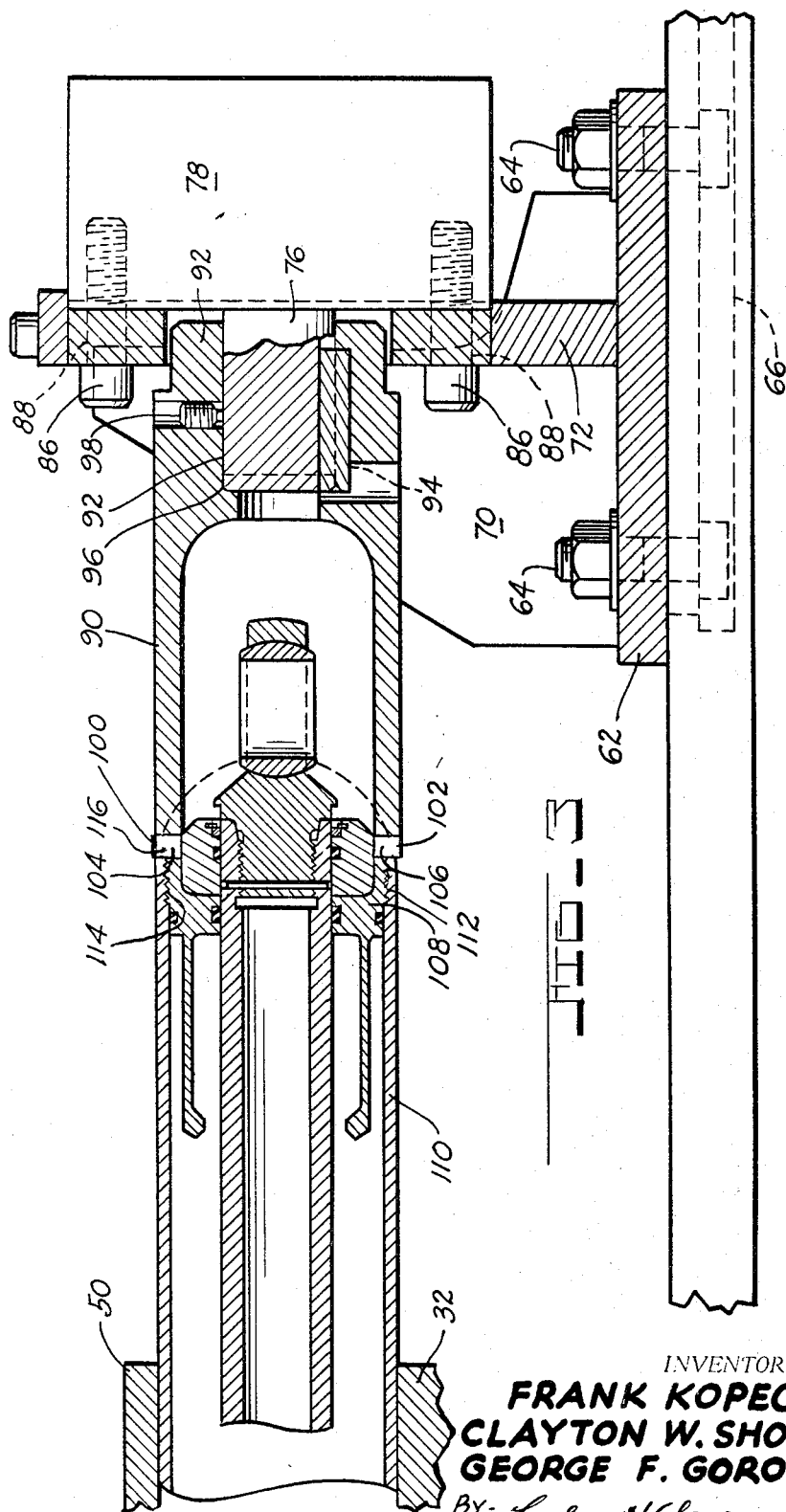
FIGURE 3 represents an enlarged sectional view taken on line 3—3 of FIGURE 2.
Figure 4:
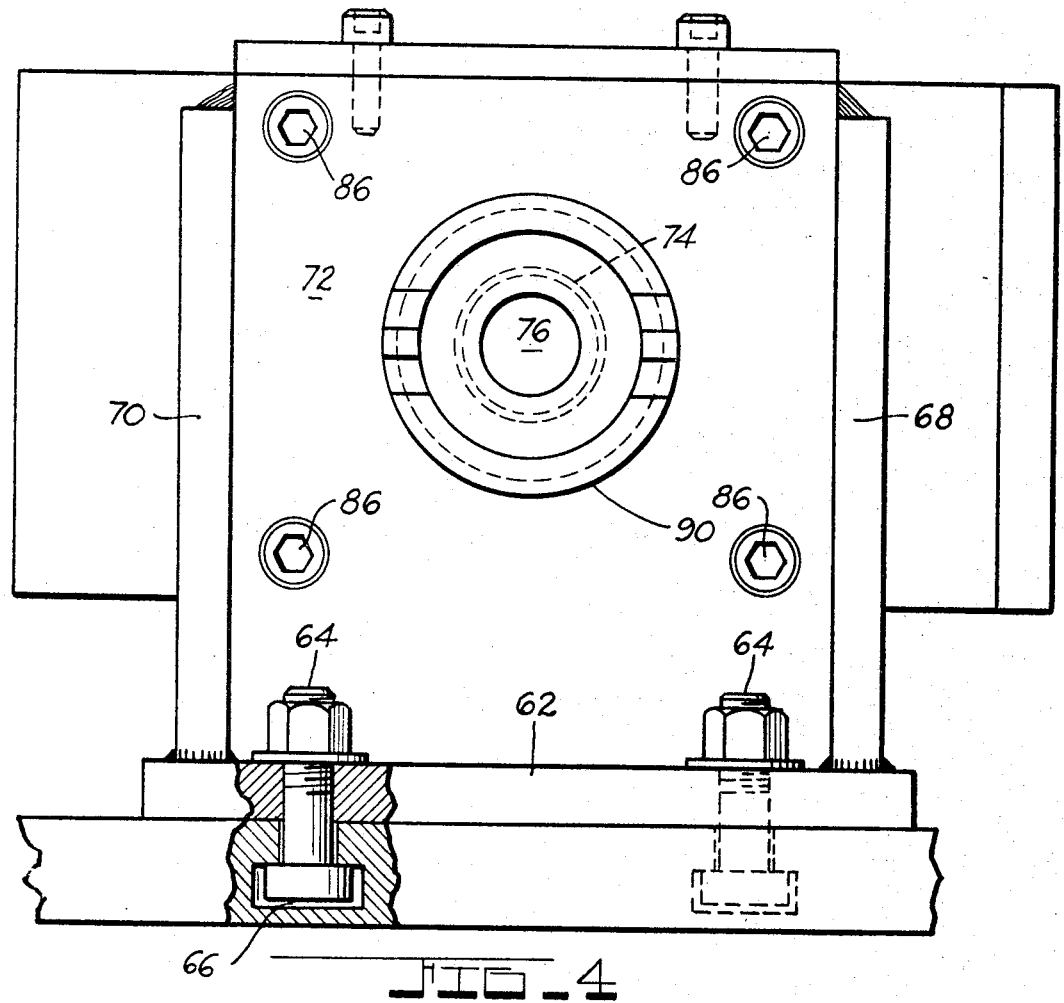
FIGURE 4 represents a sectional view taken on line 4—4 of FIGURE 1.

Referring to FIGURES 1, 3 and 4, in particular, a base plate 62 is adjustably secured to table 22 by means of a plurality of bolt and nut combinations 64 the bolt portions of which extend through openings in base plate 62 into sliding engagement with elongated T-shaped slots or guides 66 formed in table 22. The base plate 62 may be thus adjusted toward or away from the cradles 32 and 50 and locked in position relative thereto by tightening the nuts of each combination 64 to compensate for the work piece length held by cradles 32 and 50 as will be described hereinafter.

The base plate 62 is provided with upstanding spaced apart support members 68 and 70 fixedly secured thereto by suitable means such as a weld. A plate 72 transverse to support members 68 is fixedly secured thereto by suitable means such as a weld. The plate 72 is provided with an opening 74 through which extends a rotatable output shaft 76 driven by a conventional hydraulic actuator 78 responsive to a flow of pressurized fluid. The flow of pressurized fluid is generated by a constant volume fluid pump 80 connected to receive fluid from a tank 82 and driven by an electric motor 84. The pump 80, tank 82 and actuator 84 may be suitably based within the support framework 20. A heat exchange unit 85 suitably connected to tank 82 serves to maintain the temperature of the fluid within acceptable temperature limits. The hydraulic actuator 78 is a commercially available item sold under the trade name of Flo-Tork and manufactured by The Flo-Tork Corporation, Orrville, Ohio. In particular, reference is made to actuator Model No. 1000 or 1001 manufactured thereby. The hydraulic actuator 78 is removably secured in position on plate 72 by a plurality of bolts 86 which extend through mating openings 88 in plate 72 into threaded engagement with the hydraulic motor 78 housing.

A cup shaped driving member 90 bored at its closed end as at 92 to slip over output shaft 76 is concentric with shaft 76 and held in fixed position rotationally relative thereto by a key 94 suitably secured to shaft 76 and member 90. The end of shaft 76 bears against an abutment 96 defined by a reduced diameter portion of bore 92. A set screw 98 threadedly engaged with driving member 90 is adapted to engage shaft 76 thereby fixing the relative longitudinal positions thereof. The open end of driving member 90 is provided with diametrically opposite fingers 100 and 102 formed in the wall thereof which are adapted to mate with corresponding slots 104 and 106 in end fitting 108 of a two port workpiece having a cylindrical body 110 clamped between cradles 32 and 50. The end fitting 108 is provided with threads 112 which engage mating threads 114 formed on body 110 to thereby secure the fitting and body together. A flange 116 formed on end fitting 108 is adopted to abut the end of body 110 thereby locking the end fitting 108 in position in response to a predetermined torque effort applied to end fitting 108.

The control panel 60 mounted on back portion 26 is provided with manually controlled lever 58 connected to control valve means 118, shown schematically in the fluid control circuitry of FIGURE 7, which valve means 118, in turn, controls the flow of pressurized fluid between pump 80 and cylinder 36. The lever 58 has three positions as shown and designated as clamp, unclamp and neutral. A second manually controlled lever 120 mounted on panel 60 is connected to control valve means 122, shown schematically in FIGURE 7, which, in turn, controls the flow of pressurized fluid between pump 80 and hydraulic actuator 78. The lever 120 has three positions as shown and designated as torque, breakloose and neutral. A manually controlled rotatable knob 124 is suitably connected to valve means 126, shown schematically in FIGURE 7, which, in turn, controls the pressurized fluid flow from pump 80 to hydraulic actuator 78 thereby regulating the torque output of actuator 78 as indicated by a visually observable gauge 128 responsive to the pressurized fluid flow to hydraulic actuator 78 and calibrated in inch-pounds to indicate torque. A manually controlled rotatable knob 130 is suitably connected to valve means 132, shown schematically in FIGURE 7, which, in turn, controls the pressurized fluid flow from pump 80 to cylinder 36 thereby regulating the clamping pressure derived from piston 48 which pressure is indicated by a visually observable gauge 134 calibrated in pounds per square inch.

Figure 5:
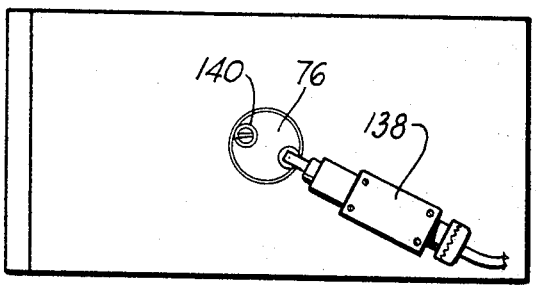
FIGURE 5 represents a right side view of a portion of the present invention taken on line 5—5 of FIGURE 1.

A visually observable light 136 suitably connected to an electrical limit switch generally indicated by 138 (see FIGURES 5 and 6) is lit to provide an indication of the hydraulic actuator 78 reaching the limit of its rotary stroke and subsequent loss of torque output. The limit switch 138 is conventional and suitably mounted to respond to the output shaft rotation of actuator 78 so as to make or break electrical flow from a suitable electrical power source, (see FIGURE 6) to light 136. As shown in FIGURE 5, an abutment 140 eccentrically converted to output shaft 76 abuts limit switch 138 to actuate the same.

A manually actuated emergency stop button 142 mounted on front portion 22 is suitably connected to switch means 143, shown schematically in the electrical wiring diagram of FIGURE 6, which, in turn, operates to shut down motor 84 thereby disabling cylinder 36 and hydraulic motor 78.

A temperature gauge 144 suitably connected to the discharge side of pump 80 and responsive to the fluid flow therefrom serves to monitor the temperature condition thereof.

Manually operated push buttons 146 and 148 suitably connected to electrical switches 150 and 152, respectively, shown schematically in FIGURE 6, serve to energize and de-energize, respectively, the electric motor 84 to thereby start and stop the pump 80.

Referring to FIGURE 7, the hydraulic control circuit includes a conduit 154 connected to supply pressurized fluid from tank 82 to valve 118 which controls the operation of piston 48. A manually actuated shut off valve 156, a fluid strainer assembly 158, constant volume pump 80, a fluid temperature sensitive element 160 downstream from pump 80 and connected to gauge 144 and a fluid filter 162 are arranged in conduit 154. A fluid return conduit 164 connected to conduit 154 downstream from filter 162 leads therefrom to tank 82 and contains a manually adjustable fluid flow control valve 166 and a two-position valve 168 actuated by an electrical solenoid 169 which is energized by limit switch 61. A conduit 170 connects to conduit 154 downstream from pump 80 and leads therefrom to the inlet of heat exchanger 85 and from the outlet of heat exchanger 85 to tank 82. A conventional fluid pressure relief valve generally indicated by 172 is disposed in flow relationship with conduit 170. A branch conduit 174 leading from conduit 170 to tank 82 contains manually adjustable valve 132 which controls the flow through conduit 174 to thereby regulate the fluid pressure in conduit 154 as desired.

The valve 118 is actuated by the three position lever 58 and is shown in one position corresponding to neutral position of lever 58 whereby conduit 154 is blocked as well as conduits 54 and 56 leading from valve 118 to cylinder 36 on opposite sides of piston 48 and conduit 180 leading from valve 118 to tank 82. In its second position corresponding to clamp position of lever 58, the valve 118 communicates conduit 154 with conduit 54 and conduit 56 with conduit 180 as represented by the parallel arrows at the bottom of valve 118 thereby pressurizing piston 48 downward. In its third position corresponding to unclamp position of lever 58, the valve 118 communicates conduit 154 with conduit 56 and conduit 54 with conduit 180 as represented by the crossed arrows at the top of valve 118 thereby pressurizing piston 48 upward. An adjustable flow restriction 182 in conduit 180 may be set to establish corresponding control over the rate of fluid flow through conduit 180 and thus the speed at which the piston 48 responds to the pressure drop thereacross.

A conduit 184 connects conduit 154 with valve 122 which is actuated by the three position lever 120 and is shown in one position corresponding to neutral position of lever 120 whereby conduit 154 is blocked as well as conduits 186 and 188 loading from valve 122 to hydraulic actuator 78 and conduit 190 leading from valve 118 to tank 82. In its second position corresponding to torque position of lever 120, the valve 118 communicates conduit 184 with conduit 186 and conduit 188 with conduit 190 as represented by the parallel arrows at the bottom of valve 118 thereby pressurizing actuator 78 which rotates in a counterclockwise direction as viewed in FIGURE 4. In its third position corresponding to breakloose position of lever 120, the valve 118 communicates conduit 184 with conduit 188 and conduit 186 with conduit 190 as represented by the crossed arrows at the top of valve 118 thereby pressurizing actuator 78 in a clockwise direction as viewed in FIGURE 4. The conduit 186 contains adjustable flow restricting valve 126 which is set by rotatable knob 124 to establish a desired fluid pressure and thus torque output of actuator 78 as indicated by pressure gauge 128 connected to conduit 186 downstream from valve 126. A by-pass conduit 191 connected at opposite ends to conduit 186 upstream and downstream from valve 126 contains a check valve 192 and an adjustable valve 194 in series flow therewith. A check valve 196 in conduit 186 intermediate valve 126 and conduit 191 serves to prevent reverse flow through valve 126. Conduit 188 contains a conventional adjustable valve 198 of the type which permits unrestricted flow through conduit 188 to actuator 78 and restricted flow from actuator 78.

The heat exchanger unit 85 is conventional in structure and operation and serves to maintain the hydraulic fluid in tank 82 at an optimum temperature. To this end, the heat exchanger unit 85 is provided with an inlet conduit 200 connected to a suitable source of relatively cool fluid 202 such as a water supply and provided with a shut-off valve 204 and an adjustable throttle valve 206 in flow controlling relationship therein. An outlet conduit 208 conducts the water, which undergoes a temperature rise as a result of heat transferred thereto from the hydraulic fluid passing through conduit 170, to a suitable drain source 210. A conventional temperature responsive element 212 immersed in the fluid of tank 82 is suitably connected to adjustable throttle valve 206 to actuate the same thereby controlling the supply of cooling water to heat exchanger 85 and thus the heat transfer rate of the latter to maintain the fluid in tank 82 at the desired temperature.

Referring to FIGURE 6 and the electric circuit schematic shown therein, the motor 84 is suitably connected to an electric power supply such as the indicated 440 v., 3φ, 60∼ source. A step down transformer 214 suitably wired to the 440 v. source provides a 110 v., 60∼ output at the terminals thereof which are connected via electrical conduit 216 having a fuse 218, normally closed emergency stop switch 143, switch 152 operative to de-energize motor 84, switch 150 operative to energize motor 84 and motor starter unit 220 wired in series therein. A second electrical conduit 222 suitably wired in parallel with switches 152, 150 and starter unit 220 contains limit switch 61 and solenoid 168 wired in series therein. A third electrical conduit 224 suitably wired in parallel with switches 152, 150 and starter unit 220 contains limit switch 138 and light 136 wired in series therein.

*Operation*

Referring to FIGURES 1 and 6, in particular, it will be assumed that the present invention is not in operation in which case the levers 58 and 120 occupy the neutral positions as shown and piston 48 occupies an upper position thereby displacing cradle 50 away from cradle 32.

The manually actuated shut-off valves 156 and 204 are opened to provide flow to pump 80 and heat exchanger 85, respectively. The motor 84 is energized by actuating switch 150 to a closed position thereby completing electrical circuit 216 which results in energization of starter 220 which, in turn, is suitably wired to motor 84 to control the starting electrical input thereto in a conventional manner and bring the motor 84 up to normal operating speed. The motor driven pump 80 delivers pressurized fluid to conduit 154 which is isolated from conduits 54, 56 and 180 by closed valve 118 in its neutral position. Likewise, conduit 184 leading from conduit 154 is isolated from conduits 186, 188 and 190 by closed valve 122 in its neutral position. The fluid pressure in conduit 154 and thus back pressure against pump 80 is relieved by valve 172 which is set to open at a predetermined pressure and by-pass fluid to tank 82 via heat exchanger 85.

The work piece including cylindrical body 110 and attached end fitting 108 is placed in position on cradle 32 and positioned longitudinally to effect engagement of fingers 100 and 102 of driving member 90 with slots 104 and 106, respectively, of end fitting 108. The lever 58 is operator actuated to its clamp position thereby actuating valve 118 to communicate conduit 154 with conduit 54 and conduit 56 with conduit 180. The resulting pressure differential generated across piston 48 actuates the same downwardly at a rate dependent upon the flow restriction of valve 182 which may be adjusted to provide any desired rate of fluid outflow from conduit 56 to tank 82. The piston 48 actuates cradle 50 into engagement with cylindrical body 110 thereby clamping body 110 securely in position both rotationally and axially. The desired clamping pressure is established by rotating knob 130 which regulates the position of valve 132 to control the fluid flow vented through conduit 174 from conduit 154 to tank 82. The resulting fluid pressure established in conduit 154 is read from gauge 134.

The hydraulic actuator 78 is energized by the operator actuating lever 120 to its torque position thereby actuating valve 122 to communicate conduit 184 with conduit 186 and conduit 188 with conduit 190 whereupon the actuator 78 is pressurized thereby rotating driving member 90 in a direction to tighten end fitting 108 on cylindrical body 110. It will be understood that the end fitting 108 and cylindrical body are preassembled and threadedly engaged under a predetermined relatively small torque condition prior to installing the attached cylindrical body and end fitting 108 in position in cradle 32 for a final torque setting. The hydraulic actuator 78 is capable of 180° rotary movement during the torqueing operation which, by virtue of the above-mentioned preliminary assembly of body 110 and end fitting 108, normally provides adequate range of movement for establishing the desired final torque between end fitting 108 and body 110. The torque output of actuator 78 is established as desired by adjusting knob 124 and thus valve 126 attached to thereto regulate the pressure of the fluid passing through conduit 186 to actuator 78. The pressure responsive gauge 128 connected to passage 186 downstream from valve 126 is calibrated in terms of inch-lbs. of torque thereby providing a visual indication of the torque output of actuator 78. In the event that the actuator 78 moves to the limit of its 180° rotary movement without establishing the desired torque, the limit switch 138 is tripped by abutment 140 thereby energizing light 136 which alerts the operator. The rate of rotational movement of actuator 78 in its torqueing direction is regulated as desired by setting the adjustable valve. The cylindrical body 110 after being released and rotated sufficiently in cradle 32 to reposition end fitting may be retorqued in the above-mentioned manner.

Assuming the end fitting 108 has been adequately torqued, the lever 58 is actuated to its unclamp position thereby actuating valve 118 to communicate conduit 154 with conduit 56 and conduit 54 with conduit 180 which results in pressurization of piston 48 upwardly thereby releasing cradle 50 from cylindrical body 110. Upon reaching its retracted position, the cradle 50 engages limit switch 61 which energizes solenoid 169 thereby actuating valve 166 to its open position which, in turn, vents conduit 164 to tank 82 causing a reduction in fluid pressure in passage 154. The reduced pressure in conduit 154 results in a reduction in the fluid pressure transmitted through conduit 56 to the lower side of piston 48 which, in turn, reduces the fluid pressure differential tending to hold piston 48 in its up position so that reversal of the pressure differential to effect downward movement of piston 48 may be accomplished rapidly when lever 58 is moved to the clamp position. Of course, the limit switch 61 is actuated to close valve 166 as the piston starts its downward stroke thereby allowing the fluid pressure in conduit 154 to return to the normal value. It will be recognized that a relatively small pressure differential is required to hold piston 48 in the up or retracted position.

The cylindrical body 110 and attached end fitting 108 may be disengaged from driving member 90 and removed from cradle 32 and the above-mentioned sequence repeated with the next workpiece. The lever 120 is moved to the breakloose position to return the hydraulic actuator 78 to the opposite limit of its rotary stroke in preparation for a subsequent torqueing operation.

In the breakloose position, valve 122 communicates passage 184 with conduit 188 and conduit 186 with conduit 190 thereby reversing the pressurization of actuator 78. The check valve 196 prevents reverse flow through valve 126 and fluid flow out of passage 186 is by way of the pass conduit 191. The adjustable valve 194 may be set to provide restriction to flow through conduit 191 as desired to establish a desired rate of rotational movement of hydraulic actuator 78 in the breakloose direction.

The motor 84 may be de-energized independently of electric circuits 222 and 224 by actuating stop button 146 which, in turn, opens switch 152 thereby de-energizing starter 220.

The electrical circuits 216, 222 and 224 are simultaneously de-energized by pushing button 142 to open switch 143 thereby effecting emergency shut-off operation.

It will be understood that an end fitting 108 may be released from cylindrical body 110 by reverse torque applied by hydraulic actuator 78. To this end, the lever 120 is actuated to the torque position to pressurize the hydraulic actuator 78 to the limit of its rotational stroke. The cylindrical body 110 is clamped in position with slots 104 and 106 of end fitting 108 engaged with fingers 100 and 102 of driving member 90. The lever 120 is actuated to the breakloose position to energize actuator 78 thereby imposing reverse torque on end fitting 108 to release flange 116 from the end of cylindrical body 110.

It will be understood that the driving member 90 and/or cradles 32 and 50 may take various shapes depending upon the shape of the end fitting 108 and body 110. However, any desired driving member 90 and/or cradles 32 and 50 may be readily attached to the hydraulic actuator 78 and clamping apparatus, respectively.

Various changes and modifications of the structure shown and described may be made by those persons skilled in the art without departing from the scope of applicant's invention as set forth in the following claims.

What is claimed is:

1. Power assisted clamp and torque apparatus for use in coupling two threadedly engaged members with a predetermined torque effort comprising:
    fluid pressure operated clamp means engageable with one of the two threaded members under a controlled clamping pressure for fixing the rotary position of said one threaded member;
    fluid pressure operated actuator means engageable with the other of the two threaded members and operative to impose a predetermined torque load thereon to threadedly couple the two threaded members under a controlled torque condition;
    a source of pressurized fluid;
    conduit means for communicating pressurized fluid from said source to said clamp means and said actuator means;
    first valve means operatively connected to said conduit means for controlling fluid flow therethrough to actuate said clamp means into engagement with the one threaded member;
    second valve means operatively connected to said conduit means for controlling fluid flow therethrough to actuate said actuator means thereby rotating the other of the two threaded members; and
    third valve means operatively connected to said conduit means for controlling fluid flow therethrough to said clamp means to regulate the clamping pressure imposed by said clamp means against the one threaded member.

2. Power assisted clamp and torque apparatus as claimed in claim 1 and further including:
    valve means operatively connected to said conduit means for controlling fluid flow therethrough to said actuator means to regulate the torque output imposed by said actuator means on the other threaded member.

3. Power assisted clamp and torque apparatus as claimed in claim 1 wherein said clamp means includes:
    a cylinder connected to receive pressure fluid from said conduit means;
    reversible piston means slidably carried in said cylinder means and responsive to a fluid pressure differential generated thereacross;
    a fixed support engageable with the one threaded member for supporting the same;
    a movable clamp member operatively connected to said piston means and actuated thereby into engagement with the one threaded member to securely clamp the same in position on said fixed support.

4. Power assisted clamp and torque apparatus as claimed in claim 3 and further including:
    an adjustable support for supporting said actuator means in spaced relationship to said fixed support; said adjustable support being adjustable to various positions to compensate for variations in length of different sets of threadedly engaged members.

5. Power assisted clamp and torque apparatus as claimed in claim 1 wherein:
    said fluid pressure operated actuator means is reversible and operative to impose a predetermined torque load on the other threaded member to thereby uncouple said two threaded members for disassembly thereof.

6. Power assisted clamp and torque apparatus as claimed in claim 1 wherein:
    said fluid pressure operated actuator means includes a rotatably actuated driving member engageable with said other of the two threaded members and having a limited range of rotary motion within which the predetermined torque effort is normally generated; and
    indicating means operatively connected to said rotatably actuated driving member and responsive to movement thereof to a limit of said rotary motion in the event the predetermined torque effort is not generated.

References Cited

UNITED STATES PATENTS

| | | | |
|---|---|---|---|
| 2,639,894 | 5/1953 | Smith | 81—56 X |
| 3,039,181 | 6/1962 | Sawdey | 29—240 X |
| 3,131,586 | 5/1964 | Wilson | 81—56 X |
| 3,246,547 | 4/1966 | O'Neill et al. | 81—54 |
| 3,256,757 | 6/1966 | Kochaver | 29—240 X |

MILTON S. MEHR, *Primary Examiner.*